United States Patent [19]
Gauthier et al.

[11] Patent Number: 5,415,948
[45] Date of Patent: May 16, 1995

[54] CURRENT COLLECTORS FOR SAFE ELECTROCHEMICAL GENERATORS, PROCESS OF PREPARATION AND GENERATORS OBTAINED THEREBY

[75] Inventors: Michel Gauthier, La Prairie; Guy St-Amant, Trois-Rivières West; Yves Choquette, Ste-Julie; Réal Boissonneault, Trois-Rivières, all of Canada

[73] Assignee: Hydro-Quebec, Montreal, Canada

[21] Appl. No.: 945,870

[22] Filed: Sep. 17, 1992

[30] Foreign Application Priority Data

Sep. 17, 1991 [CA] Canada .................. 2051614

[51] Int. Cl.⁶ .................................... H01M 4/70
[52] U.S. Cl. .......................... 429/62; 429/192; 429/234; 428/573
[58] Field of Search ............... 429/162, 192, 234, 62; 428/573, 626

[56] References Cited

U.S. PATENT DOCUMENTS

| | | | |
|---|---|---|---|
| 2,694,099 | 11/1954 | Zahn | 429/234 |
| 3,423,261 | 1/1969 | Frantzen | 428/573 X |
| 3,502,449 | 3/1970 | Phillips | 428/626 |
| 4,503,094 | 3/1985 | Breuninger | 428/626 X |
| 4,572,879 | 2/1986 | Morioka | 429/234 X |
| 4,584,628 | 4/1986 | Cichanowski | 361/309 |

*Primary Examiner*—Stephen Kalafut
*Attorney, Agent, or Firm*—Oblon, Spivak, McClelland, Maier & Neustadt

[57] ABSTRACT

Self-protecting current collector, with lateral collection an insulating plastic support film having a thickness between about 1 and 30 microns, and a conductive metallic coating, of a thickness lower than about 10 microns, adhering to at least one face of the insulating support film, compatible with the corresponding material of the electrode of the generator, and wherein its conductive surface is divided into a plurality of adjacent distinct areas, each area being electrically insulated by means of non-conductive borders except for at least one conductive bridge of small cross-section connected to a lateral common conductive margin enabling a lateral collection of the entire distinct areas; the nature and electrical resistance of the conductive bridges enabling on the one hand, passage of currents corresponding to maximum currents provided for each of the individual collection areas of the generator to be produced, and limiting on the other hand, in case of an accidental short-circuit inside an area, the maximum current received by this area originating from the entire areas of the generator.

28 Claims, 3 Drawing Sheets

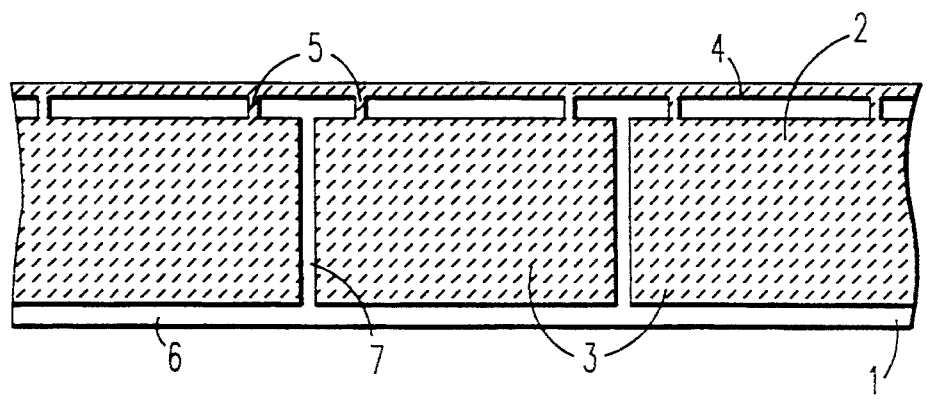
*FIG. 1A*    *FIG. 1B*
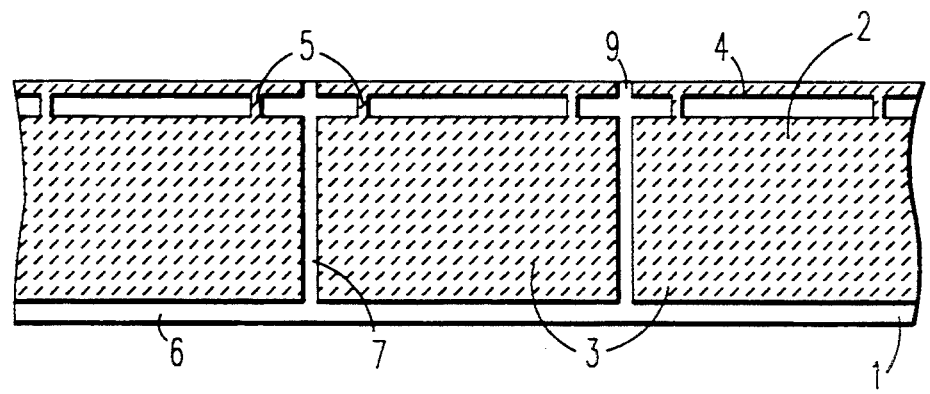
*FIG. 1C*    *FIG. 1D*
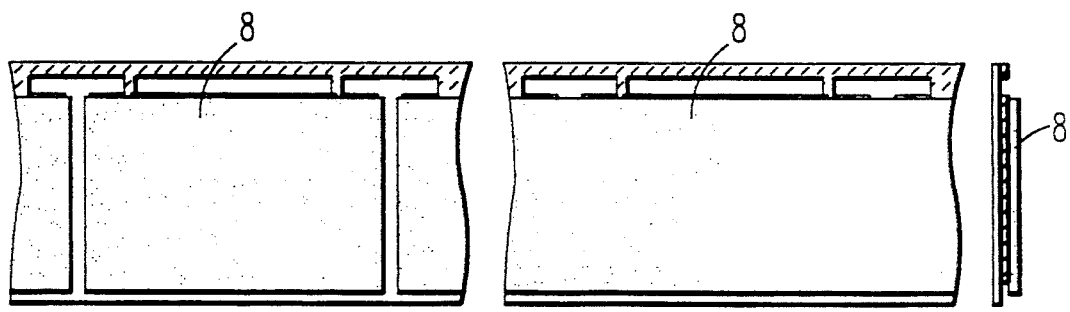
*FIG. 2A*    *FIG. 2B*    *FIG. 2C*
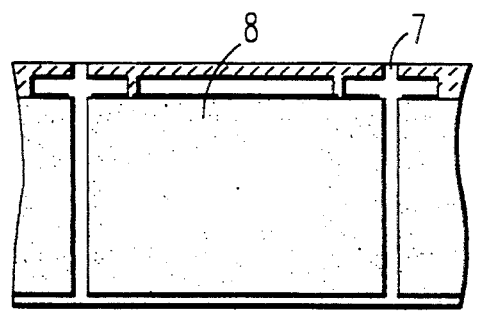
*FIG. 2D*

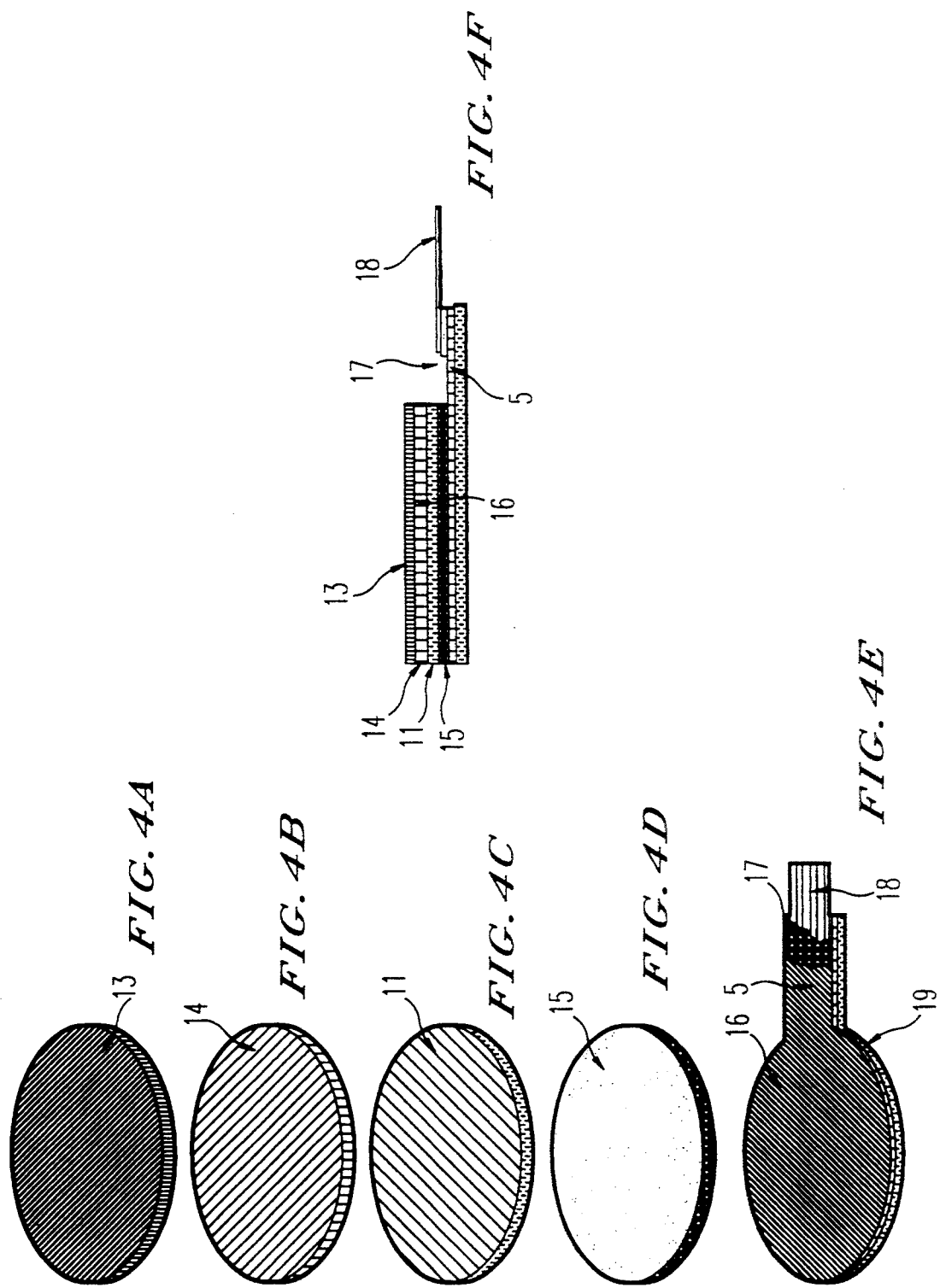

CURRENT COLLECTORS FOR SAFE ELECTROCHEMICAL GENERATORS, PROCESS OF PREPARATION AND GENERATORS OBTAINED THEREBY

BACKGROUND OF INVENTION (a) Field of the Invention

The present invention concerns current collectors for safe electrochemical generators, their processes of preparation and generators obtained utilizing these current collectors. More specifically, the present invention concerns current collectors, with lateral collection, consisting of a conductive coating supported on an insulating plastic, characterized in that the supported metallic coating is divided into a plurality of conductive areas which are insulated from adjacent areas, but are connected there between by means of a common conductive margin connected by means of conductive bridges capable of limiting or interrupting the total current received by a given area, originating from the whole of the generator, when the latter area is in a short circuit situation. The invention also comprises a process for producing such collectors and generators produced with these collectors.

(b) Description of Prior Art

Primary or rechargeable generators with high densities of energy are capable of reaching, in case of accidental rapid discharge, conditions of temperature and, possibly, pressure such as the battery may in certain extreme cases become dangerous and may even explode. Even if these extreme conditions are not always achieved, permanent damages may result to the generator.

This type of problem has increased with the introduction of lithium generators, which generally utilize liquid electrolytes and sometimes soluble cathodes. These generators contain sufficient energy so that certain designs, under conditions of major short-circuits, undergo an internal temperature increase of a few hundreds of degrees. Boiling of the electrolyte and especially, chemical reaction between lithium and the electrolyte or the cathode, may then become sudden and explosive at high temperature, particularly when the temperature exceeds the melting point of lithium, at about 180° C. This situation is particularly serious in the case of rechargeable lithium generators where the contact surface and the reactivity of lithium with the liquid electrolyte increase substantially with the number of cycles of recharge.

Other solutions have been proposed to control these problems of safety: utilization of fuses in order to interrupt or limit the current in the case of external short-circuits, replacement of fusible metallic lithium with alloys or compounds of insertion, such as $LiC_6$, which are not very fusible.

The protection of these generators against internal short-circuits is more difficult to obtain. An interesting solution has been proposed for lithium generators, in European Patent No. 0 246 866. This protection is based on the capacity of the porous plastic membrane containing the electrolyte of the separator, to melt starting from a temperature selected from below a temperature considered critical.

The present invention mainly concerns lithium generators, in solid state, utilizing electrodes, electrolyte and collectors in the form of thin films, which are produced, preferably by means of continuous processes and wherein the total thickness varies more often between 200 and 5 microns. Polymer electrolytes are already considered per se as being safer because of the solid state and their capacity to limit rapid exchanges of materials between the electrolyte and the electrodes; on the other hand, the latter are particularly suitable for use in collectors of the present invention.

The invention aims more particularly at current collectors for generators, in the form of thin films which require the development of batteries with large surfaces. These generators will more often be assembled in the form of windings or stackings and should be laterally collected in view of the length of the films to be used for storing appreciable amounts of power energy. These conditions prevent in practice the collection of currents from electrodes through the extremity of the electrode collector.

The collectors of the present invention therefore aim at improving the safety character of these types of lithium generators. Their aim is to limit the heat generated in the latter, in case of internal short-circuit, by temporarily or definitely limiting the maximum short-circuit currents which originate from the whole of the generator. This limitation is obtained by dividing the surface of at least one of the collectors of the generator into a plurality of distinct areas which are connected to a common conductive area by means of conductive bridges selected so as to permit on the one hand, the passage of currents corresponding to the normal operation of the generator and to limit or interrupt the current received by an area in case of short-circuit inside this area. According to the embodiments of the invention, the limitation of the current will enable to prevent a dangerous situation in case of accidental short-circuit, or still, it will enable to definitely isolate the defective area if the bridges are definitely melted, in which case, the generator will be able to continue to operate with a reduced capacity within the ratio of the surface of an area to the total surface of the areas of the generator.

To facilitate the production of these safe collectors, the invention utilizes collectors which are supported on plastic film. The use of these support films is easier in all-solid systems, such as generators with polymer electrolytes. Moreover, the plastic support facilitates the handling of cut out collectors, which are otherwise difficult to use, and may serve permanently to isolate the various components of the generator, for example with wound batteries, where the support acts as insulating material between superposed batteries. Similarly, the support film may facilitate the handling of collector-electrode units and be used as a support for assembling the other components and the entire generator.

An additional aim of the invention is to provide a preferred process for producing this type of safe collector which is particularly adapted to generators with thin films, in that it enables to adjust the surface conductivity of the collectors while reducing at a maximum the excess of weight or volume of the collectors. In addition to this possibility of optimizing the density of energy of the generator, this process facilitates the use of polymer electrolyte generators, according to processes inherent to films of plastic material, for example, with respect to the manufacture, control of quality and temporary storage of large mother-rollers of complexes of multi-layer films assembled in the form of batteries.

SUMMARY OF INVENTION

The present invention concerns a self-protective current collector, with lateral collection, for thin film electrochemical generator with solid polymer electrolyte, utilizing electrodes operating with alkali or alkali-earth ions, comprising the following elements:

an insulating plastic support film of a thickness between about 1 and 30 microns, selected for its compatibility with the chemical environment of the generator and treated to provide adhesives on at least one of its faces, a conductive metallic coating of a thickness lower than about 10microns, in adhesion with at least one face of the insulating support film, selected for its compatibility with the corresponding electrode material of the generator, and characterized in that its conductive surface is divided into a plurality of distinct adjacent areas, each area being electrically insulated by means of non-conductive borders except for at least one conductive bridge of small cross-section connected to a common conductive lateral margin enabling a lateral collection of the plurality of distinct areas, the nature and the electrical resistance of the conductive bridge being selected so as to permit on the one hand, the flow of currents corresponding to maximum currents provided for each individual collection areas of the generator to be produced and to limit on the other hand, in case of accidental short-circuit inside one area, the maximum current received by this area originating from the plurality of areas of the generator, for example by means of the common conductive margin.

Preferably, the conductive metallic coating leaves part of the insulating support film uncovered so as to define a non-conductive lateral margin. The insulating support film is preferably made of synthetic resins which are compatible with electrodes based on alkali or alkali-earth metals, for example polypropylene, polyethylene, polyester or polysulfone.

The metallic coating is preferably made, at least at the surface thereof, of aluminum, nickel or chromium, molybdenum, iron, gold, silver or alloys thereof when this collector is intended to be used as collector of a cathode of a generator. It is preferably made at the surface thereof, of nickel, chromium, iron, molybdenum or alloys thereof when it is intended to be used as collector of an anode of a generator. It is preferably made at the surface thereof, of nickel, chromium, iron, molybdenum or alloys thereof when it is intended to be used as an electrode of metallic lithium.

According to an embodiment of the invention, the surfaces of the individual areas are chosen so as to represent less than 10% of the total surface of the intended generator, preferably less than 1% of the latter. The conductive areas are preferably of parallelepipedal shapes. The nature, geometry and resistance of the conductive bridge(s) connecting an individual area to the common conductive margin for example, are determined so as to act as a fuse, in order to irreversibly cut the bridges when an internal short-circuit takes place in said area and the current received from the generator exceeds by a predetermined value, the maximum current to be normally generated by the electrode of the generator corresponding to the surface of this area.

According to another alternative, the nature, geometry and resistance of the conductive bridge(s) connecting an individual area to the common conductive margin, are selected si as to be capable of limiting the current which originates from the group of areas of the generator when an internal short-circuit takes place in said area so as to prevent a sudden dissipation in this area of the total energy of the generator without however limiting in appreciable manner the currents normally expected to be normally generated by the electrode of the generator corresponding to the surface of this area.

The conductive metallic coating may consist of a metal which has been metallized under vacuum, preferably selected from aluminum, gold, nickel, chromium, molybdenum, silver, iron and alloys thereof.

According to another preferred embodiment of the invention, the conductive metallic coating and the surface resistance of the individual areas, of the common conductive margin and, if required, of the conductive bridges, are provided by means of a metal which has been metallized under vacuum and preferably selected from copper, gold, nickel, chromium, molybdenum, silver, at a thickness between 0.003 and 0.1 micron, and at least one electrochemically deposited metal so as to give a deposit of a thickness between 0.1 to 4 microns, the last metal deposited being selected for its compatibility with the material of the electrode corresponding to the generator.

According to another preferred embodiment, the dimensions and the geometry of the individual areas, of the conductive bridges and, if required, the lateral insulating margin and the non-conductive transverse cross-sections are determined by local demetallization of a portion of the metallized or metallized-plated surface, preferably by removal with a laser beam or by flashing.

According to another preferred embodiment of the invention, insulating transverse sections provided between the adjacent areas or the groups adjacent areas also interrupt the common conductive lateral margin so as to insulate the conductive areas or groups thereof from one another, their conductive bridge(s) as well as a section of corresponding conductive margin. These insulating sections between the adjacent areas represent for example less khan 10% of the surface of the areas.

The invention also concerns a collector-electrode assembly described above in which the film of the material of the electrode is made of a composite anode or cathode bound by the electrolyte of the generator which covers the conductive areas and the insulating borders of the support film localized between the areas, except on the one hand for a portion of the insulating lateral margin and on the other hand, a lateral border consisting of the conductive bridges and the common conductive margin. The material of the composite electrode is preferably obtained by processes of spreading in the form of a solution or melted product or also by means of processes of transfer or lamination of adhesive film of an electrode already prepared.

According to another preferred embodiment of the invention, the film of the material of the electrode is present only on the surfaces of the distinct conductive areas of the collector, so as not to cover the non-conductive borders separating the adjacent areas, for the purpose of completely electrically insulating the defective area from the whole generator in case of an internal short-circuit of an area and irreversible break of the conductive bridges. The film of the material of the electrode for example, is made of lithium or a metallic anode. It may be obtained by extrusion, pressing or lamination of a preformed film by processes of depositing molten lithium.

The collector-electrode assembly according to the present invention may be present in a large group of wound thin batteries and temporarily stored in a safe manner in the form of a large coil in which the lateral contact inputs are not yet applied on the conductive margin of the assembly.

The invention also concerns a generator in wound or stacked shape including at least one of the collector-electrode assemblies mentioned above in which the lateral collection of the collector-electrode assembly is obtained by shooping a metal such as zinc and its alloys on the conductive margin of its collector, according to processes which are well known in the field of electrical condensators. The polymer electrolyte generator according to the invention may be in the form of a thin film formed of a group of adhesive films, assembled in wound or stacked form, including at least one of the collectors or one of the collector-electrode assemblies according to the invention.

The invention also concerns a process for the preparation of a self-limiting current collector for polymer electrolyte thin film electrochemical generator utilizing electrodes operating with alkali or alkali-earth ions, with lateral connection, characterized by the following three steps:

1—metallization, by deposit under vacuum, of the totality or a portion of the surface of at least one face of an insulating support film to a thickness between 1 and 30 microns, with a metal selected to promote an electrochemical deposit and having a sufficient electronic conductivity to permit the initiation of an ulterior electrochemical deposit, 2—electrochemical deposit of at least one additional metal, at a total thickness between 0.1 and 4 microns, on the totality or a portion of the metallized surface so as to reduce the electrical surface resistance of the collector to a sufficient value to prevent losses by resistive effect in the latter, the last metal deposited being chosen for its compatibility with the material of the electrode corresponding to this collector, 3—local removal of a more or less substantial portion of the supported conductive surface so as to subdivide the surface into adjacent distinct conductive areas which are connected there between by means of a common conductive lateral margin, the electrical contact between the distinct areas and the conductive margin being ensured by one or more electrical bridges of small cross-section, characterized in that the nature, the geometry and the electrical resistance of the conductive bridge(s) are selected so as to enable on the one hand, the flow of currents corresponding to maximum normal currents anticipated for each of the areas of the generator, and to limit or interrupt on the other hand, in case of internal short-circuit inside an area, the maximum current received by this area from the whole surface of the generator.

Preferably the process of metallization under vacuum is selected among simple or assisted thermochemical vaporization processes of the cathodic polarization or electron beam type and preferably provides a thickness which varies between 0.005 and 0.1 micron.

Conductive metallization normally consists of elements which are compatible with the electrochemical deposit, and are preferably selected from copper, nickel, molybdenum, chromium, silver, gold and alloys thereof, preferably having a surface resistance lower than 5 $\Omega$/square and does not cover the entire surface of the insulating support so as to leave a non-conductive lateral margin on the border opposite that defined by the common conductive margin.

The last electrochemically deposited metal is preferably iron, nickel, chromium and the conditions of the electrochemical deposit may be used to produce a local variation of the electrical resistance of the deposit or to control the state of the external surface of the metal deposited.

The removal of a portion of the conductive surface is preferably made by laser machining, by flashing or also by means of mechanical chemical processes, for example before the step of electrochemical deposit so as to be able to rapidly define the shape and the sizes of the areas, the conductive bridges, the common conductive margin and, if needed, the transverse sections along the entire width of the support film.

The surface of the individual areas is normally selected so as to represent less than 10% of the total surface anticipated for the collector of the generator, preferably less than 1% of this surface. The insulating support film preferably consists of plastic materials preferably containing high purity polypropylene, polysulfone, polyethylene or polyester, previously treated by corona discharge on the surface(s) to be metallized and selected for their chemical compatibilities with the chemical environment of the electrochemical generator operating with electrodes containing alkali metals. The process may also include an additional step of utilizing an electrode material consisting of an anode or a cathode of the generator so as to constitute an adherent electro-collector assembly; said electrode material however not being applied on the non-conductive lateral margin nor on the opposite border of the support film containing the conductive bridges and the common conductive margin. The electrode material may also be applied by processes of spreading by solubilization, in molten condition or by transfer or lamination of a previously prepared film.

The electrode coating usually covers only the metallized surfaces of the conductive areas.

BRIEF DESCRIPTION OF DRAWINGS

The characteristics and advantages of the invention will appear from the description which follows given by way of example and without limitation with reference to the annexed drawings in which:

FIG. 1A is a schematic and plan view of a collector according to the present;

FIG. 1B is another schematic view of a variant;

FIGS. 2A, 2B, 2C are plan views of other variants;

FIG. 4 is a partial exploded illustration of a battery consisting inter alia of collectors according to the invention.

DESCRIPTION OF PREFERRED EMBODIMENTS

Figure 3:
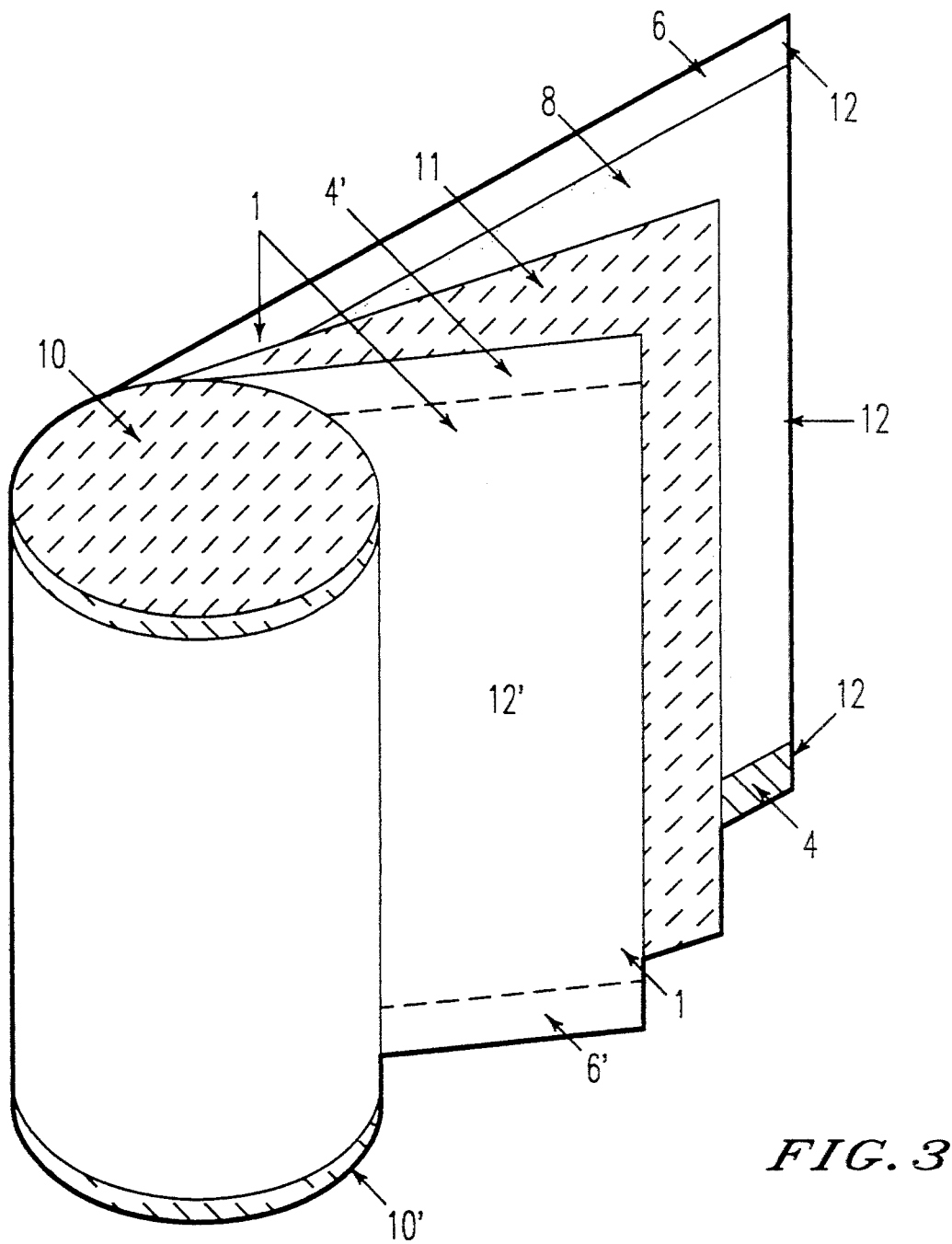
FIG. 3 is a perspective view of the mounting of a generator by winding utilizing collectors according to the invention.

FIGS. 1 to 4 will enable to better understand the invention and to illustrate other advantages thereof. These Figures are not according to the true proportions of the elements, in order to facilitate their understanding. The numbering referring the Figures to the description is used only to facilitate the reading, and should not be considered as a limit of the scope or the meaning of the latter.

The collectors and the collector-electrode assemblies of the present invention are illustrated briefly in FIGS. 1a and 1b, by way of non-limiting example. They are characterized by the following elements:

- a thin support film of insulating plastic material 1 enabling to handle the collector and to make it electrically insulating towards other components of the generator,
- a thin conductive coating 2, adhering to at least one of the faces of the support, divided into a plurality of conductive areas 3 which are insulated from adjacent areas via non-conductive sections 7 and in contact with a common lateral conductive margin 4 by means of conductive bridges 5, the surface of each area being selected so as to represent less than 10%, preferably less than 1% of the surface of the areas of the whole generator; parallelepipedic shapes are particularly advantageous for the preparation of these areas,
- the conductive bridge(s) 5 being selected of a material and shape such that they are capable on the one hand, to limit or irreversibly interrupt the current received from the whole generator by means of a conductive area in a situation of short-circuit, and they are on the other hand, sufficiently conductive to fully support the current peaks collected by this area and resulting from normal conditions of use of the generator.
- a non-conductive longitudinal margin 6 of the opposite border of the common conductive margin, preferably obtained by an incomplete covering of the insulating film by means of the conductive coating, so as to facilitate the preparation of the generator and the application of electrical contacts at the lateral ends once the assembly is terminated.

When this type of collector is used in the whole generator, the film surface of the corresponding electrode 8 is fixedly mounted so as to cover the conductive areas 3 except for at least part of the longitudinal insulating margin 6, and preferably, except for the common margin 4 and the lateral zone where the conductive bridges 5 are present.

These types of collectors 3 may be mounted on one or both faces of the insulating support film 1 and may be used for either of the electrodes of the generator as long as the coating constituting the material of the electrode 8 is applied longitudinally and that discontinuities in the coating coincide with non-conductive sections 7 transversely separating the adjacent areas such as illustrated in FIG. 2A, so as to prevent a possible electronic contact with the coating electrode. With this manner of using collectors of the invention, a defective area which is in short-circuit will be completely isolated from the remainder of the generator when the fusible conductive bridges of this area will have been destroyed and the remainder of the generator may be preserved.

A useful variant of the previous design illustrated in FIG. 2b, is obtained by utilizing the collector of FIG. 1b, for which the conductive margin 4 is also cut out by means of sections 9. This variant facilitates the temporary storage of wide windings of batteries stacked over one another by utilizing these collectors for which no contact is possible between the individual areas as long as lateral collectors have not been applied at the ends of the windings. This variant facilitates the safe storage of wide windings of batteries assembled in "Power Roll" while enabling to control and isolate deficient areas during the manufacture of laminated batteries for example in the cases where an area would have only one partial short-circuit.

When the coating electrode 8 is a composite electrode bound by a polymer, i.e. an anode or a cathode, continuously applied on the collector of the invention, the latter may produce a partial electronic conductivity between the adjacent areas, (see FIG. 2C). With this embodiment of the invention, a defective area which is in short-circuit, will not be completely isolated from the whole generator, even after ruptures of the conductor bridges, in which case, the generator will be protected against a sudden discharge, but will undergo a rather slow self-discharge, according to the designs used and the surface conductivity of the composite electrode coating.

The present invention also covers a process for the production of these current collectors and the corresponding collector-electrode assemblies which are particularly welladapted to the specific needs of polymer electrolyte generators, particularly those operating with lithium based electrodes and at relatively high current densities, for example, of the order of a milliampere per square centimeter. These generators require current collectors in which the specific surface resistance should be lower than 0.5 $\Omega$/square, preferably lower than 0.1 $\Omega m$/square, but in which the excess of conductive metal should be limited. A higher specific surface resistance means voltage drops of the generator when the distance of lateral collection becomes appreciable. Equation 1 hereinbelow enables, as a first approximation, to select the surface resistance which is required for a collector of a given width bearing in mind the maximum current density anticipated during normal use:

$$\Delta V = (I/cm^2)\,(\Omega/\square)\,L^2/2 \qquad (I)$$

where $\Delta V$ is the admissible voltage drop for the film collector, $(I/cm^2)$ is the maximum current density in normal use, $(\Omega/square)$ represents the surface resistance of the current collector and L the length of the electrode to be drained, for example, the width in centimeters of the film collector. The admissible voltage drop may vary depending on the type of application which is intended, however, in the majority of cases this ohm drop should remain lower than a few percentages of the voltage of the generator.

The process of production is characterized by the following three steps:
- metallization under vacuum of at least a portion of the surface of at least one face of an insulating support film with a metal adapted for electrochemical deposit,
- electrochemical deposit of a metal which is compatible with the corresponding electrode of the generator at a thickness which is sufficient to give a conductive surface resistance lower than 0.5 $\Omega$/square, preferably lower than 0.1 $\Omega$/square,
- removal, preferably by laser beam or flashing, of at least a portion of the conductive surface so as to subdivide the surface of the collector into a plurality of distinct adjacent areas, connected together by means of a common conductive margin by means of one or more conductive bridges of which the nature and the electrical resistance are such that these bridges may limit or interrupt the current which circulates between one area and the common margin.

Some elements of these devices and of this process closely resemble existing devices and processes, described for the production of electrostatic condensers, such as U.S. Pat. No. 2,683,792, French Patent No. 2,637,118, U.S. Pat. No. 4,494,168 and European Patent No. 0,073,555. They also include elements which are common with the patent applications filed concurrently in the U.S. under Ser. Nos. 07/945,893 and 07/945,899. The fact that the collectors according to the present invention are close in some respects to the elements or the processes of utilizing collectors of electrostatic condensers follows the evolution of lithium generators towards entirely solid systems consisting of films which are thinner and thinner. This similarity is particularly visible at the level of the possible assembling procedures, for example, cylindrical or flat winding as well as flat stackings in zig zag or in discontinuous stackings and manners of collecting current from electrodes through the ends of the arrangements, preferably by projection of zinc such as illustrated in FIG. 3. This Figure is a very schematic illustration of a manner of mounting generators by winding utilizing two collector-electrode assemblies 12 and 12' and a film of electrolyte 11. The details of the areas and the bridges are not illustrated in this Figure; conductive margins 4,4' and non-conductive margins 6,6' are provided; the zinc collectors applied by shooping at the lateral ends of the wound films are however represented at 10 and 10'.

However, there are major differences between the two techniques, for example with respect to the additional electrochemical components in the case of generators, problems of electrochemical compatibility and chemical environment required by the extreme chemical activity of the materials of the electrodes, especially when alkali metals are used. Moreover, major differences are also present with respect to current collectors as well as insulating materials. The required conductivity of the collectors of the generators is clearly higher, in the majority of cases, than the specific surface resistance of the frameworks of the collectors which have been metallized under vacuum with aluminum and zinc, which is purposely limited at more than 1 $\Omega$/square to enable an easy self-healing. Other major differences are present with respect to the insulating film which should be selected for its compatibility with the chemical environment of the generator rather than for its high dielectric properties; the voltage gradients rarely exceed more than 4 volts/micron in a generator, as compared to 250 volts/micron for an electrostatic condenser. The stability of a material in the presence of the chemical environment of the generator is defined as the resistance to oxidation or reduction by the materials of the electrodes when in direct physical contact or, through the absence of contaminants which are susceptible to slowly diffuse and contaminate the materials of the electrodes or their interfaces, for example, $H_2O$, synthesis residues and degradation products. This criteria is particularly important when the generator uses electrodes based on alkali or alkali-earth metals.

The following examples will enable to use various non limiting embodiments, of the devices of the invention, to show their advantages and to distinguish the latter from the prior art. The electrolytes and the cathodes used for these examples, as well as the ways of producing thin film generators have been described previously in prior art patents such as: U.S. Pat. No. 3,303,748; U.S. Pat. No. 4,579,793; U.S. Pat. No. 4,851,307 and U.S. Pat. No. 4,505,997.

EXAMPLE 1

In this arrangement, illustrated in FIG. 4, a small battery consisting of a lithium anode 14, 15 microns thick laminated on a nickel sheet 13, 7 microns thick, a polymer electrolyte 11 consisting of a polyether or ethylene oxide with a lithium salt of formula $CF_3SO_2)_2$-NLi and a composite electrode based on $TiS_2$ 15, about 1.5 C/cm² is prepared. The film of this cathode is prepared by spreading by means of a solvent on a polyester film support 19 metallized with aluminum 16 and whose specific surface resistance is 5 $\Omega$/square. This supported collector-cathode arrangement is cut out so as to be able to collect current from the cathode through a tongue of the metallized collector which is not covered by the cathode. An epoxy resin loaded with silver 17 is used to provide contact between the metallized tongue and the external collector 18. This generator of which the useful surface is 4 cm² is cycled, at 25% C, for more than 75 cycles at discharge/charge currents of 80 to 60 $\mu$A respectively. The performances obtained with this generator are equivalent to those of a generator where the cathode is prepared on a film of aluminum of 15 microns, i.e. the rate of use of the material of the cathode is stable at 80% after 75 cycles. This test clearly establishes the interest and the feasibility of the ultra-thin current collectors, about 200 Å of aluminum in all solid generators. However, for certain types of polymer electrolyte generators, the current densities to be collected may reach a few mA/cm², and the depths of the electrodes to be laterally drained, L of equation 1, may exceed 10 cm in certain wound generators, the ohm drops produced in the metallized collector then become too adverse on the voltage. The use of a metallized collector under vacuum is therefore limited to generators of small dimensions requiring no elevated current densities; this excludes, for example, generators intended for electrical traction. Moreover, with use, this type of metallization is very delicate to use and easily becomes damaged and corroded.

The battery and its wrapping consisting of a thermoweldable Al/PP complex, is finally used to illustrate the safety aspect of collectors which are capable of limiting or interrupting excessive currents. After cycling, the battery is therefore directly connected to the terminals of an AC supply (110 V, 60 Hertz). No apparent damage of the generator was noted from the outside, even though the latter is instantaneously and irreversibly destroyed. A local demetallization is noted during dismantling in the zone of the tongue serving as fusible bridge 5 and for an external contact. Under similar conditions, a generator build with a cathode prepared from aluminum of 15 microns undergoes an explosive degradation with local melting of the collectors. This example illustrates well the safety characteristic of the collectors of the invention including fusible bridges.

EXAMPLE 2

This example illustrates an embodiment of a safe generator. This example is based on a metallized aluminum collector supported on polypropylene (4 $\Omega$/square) for use with a $TiS_2$ cathode in a winding of type AA. This collector is designed for lateral collection and external contact point by pulverization of zinc. This type of generator prepared with polymer electrolytes is generally illustrated in FIG. 3. By way of example, the sizes of the collector of this winding are believed to be about 180 cm long by 5 cm wide. The surfaces of the areas to be used will therefore be 9 cm$^2$, if it is intended to divide the whole surface of the generator into areas representing less than 1% of its capacity. 1% is considered reasonable to prevent a notable change of the capacity of the generator as a result of the loss of a defective area, if the latter is mounted in series with other generators. From the electrochemical characteristics of a battery similar to that of Example 1, the current density in a normal period is determined to be 1 mA/cm$^2$. The fusible bridges of an area of 9 cm$^2$ should therefore be able to support normal currents of the order of 9 mA without appreciable ohm drop. To prevent an accidental opening of the bridges of an area, the opening current of the bridges is fixed by way of example, to three times the normal current produced by an area of 9 cm$^2$, for example 27 mA. By way of comparison, the normal current of the entire cell AA is, in this case, 900 mA, which is sufficient to produce the rupture of the bridges. Various possible shapes of the conductive bridges have been tried by varying the lengths and the widths of the latter. These bridges are produced by demetallizing through mechanical removal, or by cutting, a portion of the conductive surface of propylene, and the test was made by completely surrounding the film supporting the bridges with a large number of polypropylene sheets so as to reproduce the conditions of a complete winding. It has been noted during these tests that to limit the rupture current at 27 mA with this collector, a bridge having a surface smaller than 8 mm$^2$, preferably smaller than 2 mm$^2$ should be made, possibly with an elongated shape, for example 2 mm×1 mm or 4 mm×0.5 mm. Two areas of 9 cm$^2$ provided with their bridge, measuring 2 mm long and 1 mm wide, are thus produced with the collector of aluminum on polypropylene and mounted independently as two complete generators Li/TiS$_2$. In both cases, verification is made that the bridges remain intact when currents of 9 mA are produced by the generator and that its voltage is not-affected by the presence of the bridges. These generators are cycled to verify the stability of the areas and bridges; a normal rate of utilization of 80% is noted after about 10 cycles at 200 µA in discharge and 150 µA in charge. However, when an external current source is used to force a reverse current, so as to simulate a defective behavior or an area of 9 cm$^2$ in the case of a generator of type AA$_2$ the bridges break at 25 and 30 mA respectively after a few seconds, which confirms the behavior noted during a study of collectors alone. The rupture of the bridges correspond to a local burn of aluminum, without apparent damage to the support film and to the other surrounding films.

Other shapes for conductor bridges which are more optimized may of course be developed while taking into account the specific needs of the generators of the invention, for example with respect to the optimization of the performances, the number, the shape and the resistance of the surface of the bridges as well as by the use of demetallization with laser illustrated in the following example 3. This example aims only at illustrating how the collectors may be used and designed to limit the heat produced in a defective area and to protect the whole of the generator, in certain embodiments, for example when the collector-cathode assembly is prepared by respecting the arrangement of FIGS. 2A and 2B.

EXAMPLE 3

In this example, a collector according to the process of the invention is prepared by metallizing under vacuum a polypropylene film of high purity treated by corona discharge. Copper is used for the metallization because this metal constitutes an ideal substrate to electrochemically deposit a coating of nickel. The resistance obtained from a bath of sulfamate at 40° C. has a thickness of about 0.3 micron and surface resistance lower than 0.1 Ω/square. Tests of demetallization with $CO_2$ pulsed laser, 2100 nanoseconds and 10.6 microns of wave length, show that this technique may be used before electrochemical plating to rapidly control the surface and the shape of the areas, the bridges and the margins before electrochemically depositing nickel. The precision of the outlines obtained by laser demetallization is very good and of the order of a few microns, and the polypropylene film remains intact. After plating, the sizes of the areas of the conductive coating are substantially the same when the thickness of the coated nickel is 0.3 micron. However, tests of laser demetallization indicate that it is also possible to demetallize after electrochemically depositing when the thickness of the latter does not exceed a micron by much.

EXAMPLE 4

This example is similar to example 2 except that it is directed to a generator of larger size with higher current performances. The other difference comes from the type of collector used for the cathode, in which the surface resistance is optimized accordance to the process of the invention described in example 3, for example by copper metallization and nickel plating on PP. The characteristics of the area under consideration in this example and schematically illustrated in FIG. 1, are the following: sizes (30 cm×12 cm) or 1% of the total surface, average voltage 3 volts, normal used pulse current (5 mA/cm$^2$). These data are derived from an arrangement of a 100 Wh cylindrical winding based on a battery of the type vanadium oxide/lithium optimized for electrical traction, operating at 60° C., and in which the outer dimensions are about 15 cm high by 8 cm diameter. The maximum normal current of an area is therefore 1.8 A. Various shapes of the bridges are studied and the more frequent shape retained for tests made on the collector PP/Cu/Ni/(p.3µ) is a tongue containing contraction consisting of two V shape notches facing one another. The electrical bridges are prepared in this case by mechanical abrasion and by direct cutting up of the supported film of the collector for reason of ease of operation. A current which breaks bridges prepared with these films is noted at an average value of 0.35 A per mm width separating the V. When the film PP/Cu/Ni is maintained between other films of polypropylene, breaking of the fuse is produced by melting or burning of the metals. It is interesting to note the effect of the power dissipated by the breaking of the fuse; for a width of 3 mm the energy which is released by the fuse has damaged 9 thicknesses of adjacent PP (28 microns), as compared to 3 for a width of 1.5 mm and none for a width of 1 mm. The conclusion is that it is preferable to dissipate the energy released by the bridges on a higher surface, by increasing the number of bridges for a same equivalent width. It is therefore possible to use with advantage current collectors which have been optimized by metallization/plating to produce areas protected against excessive currents, which can originate from the generator per se, by means of resistive or fusible bridges. In this case, for a rupture current fixed at 6 A, or about three times the current of an area during normal use, there should be provided 17 fuses of 1 mm width per individual area.

A battery is mounted from the electrical components mentioned in this example. The collector PP/Cu/Ni(o.3μ) is prepared according to example 3. An area measuring 10 cm×10 cm and four bridges 1 mm wide are provided on a border, by mechanical removal of the deposit after plating. The material of the composite cathode is vanadium oxide applied by solvent means by serigraphy and the generator is completed by transfer of the other components at 80° C. The electrical contact with the collector-cathode assembly is obtained by connecting the collector to a copper sheet by means of an epoxy resin loaded with silver. It is noted first that the bridges provided have no effect on the voltage during discharges at 0.5 A. However, when the area is placed in internal short-circuit and an external source of voltage of 3 V is connected on the outside, the bridges rapidly break in series when the current reaches 2A.

It goes without saying that this example does not constitute an optimized device and that advantageous modifications may be incorporated therein, for example with respect to the shape of the bridges and the areas, local thicknesses of the collectors which may be controlled during the stage of electrochemical plating so as to optimize the specific surface resistance of the area; other criteria may also be used according the present invention to differently define the shape and size of the bridges so as to adapt the collectors to specific generators.

We claim:

1. Self-protecting current collector, with lateral collection, for thin film solid polymer electrolyte electrochemical generator, utilizing electrodes operating through alkali or alkaline-earth ions, comprising the following elements:
    an insulating plastic support film having a thickness between about 1 and 30 microns, compatible with the chemical environment of the generator;
    a conductive metallic coating, of a thickness lower than about 10 microns, adhering to at least one face of the insulating support film, compatible with the corresponding material of the electrode of the generator, and wherein its conductive surface is divided into the plurality of adjacent distinct areas, each area being electrically insulated by means of non-conductive borders except for at least one conductive bridge connected to a lateral common conductive margin enabling a lateral collection of the entire distinct areas; the electrical resistance of the conductive bridges enabling on the one hand, passage of currents corresponding to maximum currents provided for each of the individual collection areas of the generator to be produced, and limiting on the other hand, in case of an accidental short-circuit inside an area, the maximum current received by this area originating from the entire areas of the generator.

2. Collector according to claim 1, in which the conductive metallic coating leaves part of the insulating support film uncovered so as to define a non-conductive lateral margin.

3. Collector according to claim 1, in which the insulating support film consists of synthetic resins which are compatible with electrodes based on alkali or alkali-earth metals.

4. Collector according to claim 3, wherein the synthetic resin consists of polypropylene, polyethylene, polyester or polysulfone.

5. Collector according to claim 1, in which the metallic coating consists, at least at the surface thereof, of aluminum, nickel, chromium, molybdenum, iron, gold, silver or alloys thereof when said collector is intended to be used as collector of a cathode of a generator.

6. Collector according to claim 1, in which the metallic coating consists at the surface thereof, of nickel, chromium, iron, molybdenum or alloys thereof when said collector is intended to be used as collector of an anode of a generator.

7. Collector according to claim 6, in which the metallic coating, at the surface thereof, consists of nickel, chromium, iron, molybdenum or alloys thereof when said collector is intended to be used as an electrode of metallic lithium.

8. Collector according to claim 1, in which the surfaces of the individual areas represent less than 10% of the total surface of the generator to be produced.

9. Collector according to claim 1, in which the surfaces of the individual areas represent less than 1% of the total surface of the generator.

10. Collector according to claim 1, in which the conductive areas are substantially parallelepipedal.

11. Collector according to claim 1, in which the nature, geometry and resistance of the conductive bridge(s) connecting an individual area to the common conductive margin act as fuse in order to irreversibly cut said bridges when an internal short-circuit takes place in said area and the current received from the generator exceeds by a predetermined value the maximum current provided to be only generated by the electrode of the generator corresponding to the surface of this area.

12. Collector according to claim 1, in which the nature, the geometry and the resistance of the conductive bridge(s) collecting an individual area to the common conductive margin capable of limiting the current originating from the entire areas of the generator when an internal short-circuit takes place in said area so as to prevent a sudden dissipation in this area of the total energy of the generator without substantially limiting the currents normally expected to be normally produced by the electrode of the generator corresponding to the surface of this area.

13. Collector according to claim 1, in which the conductive metallic coating consists of a metal metallized under vacuum.

14. Collector according to claim 12, in which the metal is selected from the group consisting of aluminum, gold, nickel, chromium, molybdenum, silver, iron and alloys thereof.

15. Collector according to claim 1, wherein the conductive metal coating and the surface resistance of the individual areas, the common conductive margin and the conductive bridges are provided by means of a metal metallized under vacuum and selected from copper, gold, nickel, chromium, molybdenum, silver, iron and alloys thereof, at a thickness between 0.005 and 0.1 micron and, at least one metal electrochemically deposited so as to give a deposited thickness between 0.1 to 4 microns, the last metal deposited being compatible with the material of the electrode corresponding to the generator.

16. Collector according to claim 15, wherein the sizes and shape of the individual areas, of the conductive bridges and the lateral insulating margin and the transverse non-conductive sections are provided by local demetallization of a portion of the metallized or metallized-plated surface.

17. Collector according to claim 16, wherein the demetallization is carried out by removal with a laser beam or by flashing.

18. Collector according to claim 1, in which transverse insulating sections provided between the adjacent areas also interrupt the common conductive lateral margin so as to insulate, the conductive areas from one another or the entire conductive areas, the conductive bridge(s) as well as the corresponding portion of the conductive margin.

19. Collector according to claim 15, in which the insulating sections between the adjacent areas represent less than 10% of the surface of the areas.

20. Collector-electrode assembly utilizing a collector according to claim 1, including an electrode made of a film material consisting of a composite anode or cathode bound by the electrolyte of the generator which covers the conductive areas and the insulating borders of the support film located between the areas, except on the one hand, for part of the insulating lateral margin and on the other hand, a lateral border consisting of conductive bridges and the common conductive margin.

21. Collector-electrode assembly according to claim 20, in which the material of the composite electrodes obtained by processes of spreading in form of solution or molten product or by processes of transfer or lamination of an adhesive film of an already prepared electrode.

22. Collector-electrode assembly according to claim 20, in which the film of the material of the electrode is present only at the surfaces of the distinct conductive areas of the collector, so that the non-conductive borders separating adjacent areas are not covered, in order that in case of internal short-circuit of an area and irreversible break of the conductive bridges, the defective areas be totally electrically insulated from the whole of the generator.

23. Collector-electrode assembly according to claim 22, in which the electrode film consists of lithium.

24. Collector-electrode assembly according to claim 23, in which the electrode film is obtained by extrusion, pressing or laminating of a preformed film or by processes of applying molten lithium.

25. Collector-electrode assembly according to claim 20, wherein said collector includes transverse insulating sections provided between the adjacent areas and which also interrupt the common conductive lateral margin so as to insulate the conductive areas from one another or the entire conductive areas, the conductive bridge(s) as well as the corresponding section of conductive margin, which is present in a large unit of thin batteries wound and temporarily stored in a safe manner in the form of a large coil in which lateral contacts are not yet applied on the conductive margin of said unit.

26. Generator in wound or stacked form including at least one of the collector-electrode assemblies according to claim 20, in which the lateral collection of said collector-electrode assembly is obtained by shooping of a metal on the conductive margin of its collector.

27. Polymer electrolyte generator in the form of thin film formed of a plurality of adhesive films, mounted in wound or stacked form, including at least one collector-electrode assembly according to claim 1.

28. Polymer electrolyte generator in the form of thin film formed of a plurality of adhesive films, mounted in wound or stacked form, including at least one collector-electrode assembly according to claim 20.

* * * * *